US011677991B1

(12) United States Patent
Balannik

(10) Patent No.: US 11,677,991 B1
(45) Date of Patent: Jun. 13, 2023

(54) CREATING AUTOMATICALLY A SHORT CLIP SUMMARIZING HIGHLIGHTS OF A VIDEO STREAM

(71) Applicant: AnyClip Ltd., Givatayim (IL)

(72) Inventor: Vadim Balannik, Rehovot (IL)

(73) Assignee: AnyClip Ltd., Givatayim (IL)

( * ) Notice: Subject to any disclaimer, the term of this patent is extended or adjusted under 35 U.S.C. 154(b) by 0 days.

(21) Appl. No.: 17/585,679

(22) Filed: Jan. 27, 2022

(51) Int. Cl.
| *H04N 21/234* | (2011.01) |
| *H04N 21/8547* | (2011.01) |
| *H04N 21/858* | (2011.01) |
| *G06F 40/40* | (2020.01) |
| *G10L 15/26* | (2006.01) |

(52) U.S. Cl.
CPC ........... *H04N 21/234* (2013.01); *G06F 40/40* (2020.01); *G10L 15/26* (2013.01); *H04N 21/8547* (2013.01); *H04N 21/8586* (2013.01)

(58) Field of Classification Search
CPC ................................................ H04N 21/47217
See application file for complete search history.

(56) References Cited

U.S. PATENT DOCUMENTS

| 7,466,858 | B2 | 12/2008 | Denoue et al. |
| 8,254,671 | B1 | 8/2012 | Roth et al. |
| 9,578,377 | B1 * | 2/2017 | Malik ..................... H04N 21/84 |
| 10,412,391 | B1 | 9/2019 | Balannik |
| 2005/0078868 | A1 | 4/2005 | Chen |
| 2005/0154679 | A1 | 7/2005 | Biclak |
| 2011/0064381 | A1 | 3/2011 | Circlaeys et al. |
| 2012/0229629 | A1 | 9/2012 | Blumstein-Koren et al. |
| 2016/0042251 | A1 | 2/2016 | Cordova-Diba et al. |
| 2018/0077440 | A1 * | 3/2018 | Wadhera ............ H04N 21/8456 |
| 2018/0246983 | A1 | 8/2018 | Rathod |
| 2019/0279685 | A1 | 9/2019 | Klinger et al. |
| 2021/0021912 | A1 | 1/2021 | Rozhenkov et al. |
| 2021/0397641 | A1 | 12/2021 | Flider et al. |
| 2022/0053039 | A1 | 2/2022 | Bhatt et al. |
| 2022/0301579 | A1 * | 9/2022 | Cao ......................... G10L 25/57 |
| 2022/0327402 | A1 * | 10/2022 | Tiwari ..................... G06N 5/04 |

OTHER PUBLICATIONS

Official Action dated Aug. 23, 2022 from US Patent and Trademark Office Re. U.S. Appl. No. 17/665,636. (18 pages).

* cited by examiner

*Primary Examiner* — Hsiungfei Peng

(57) ABSTRACT

Disclosed herein are methods, and program products for creating automatically a short video clip summarizing highlights of a long video stream, comprising identifying a plurality of topics in a video stream based on analysis of the video stream's content, extracting a plurality of sentences based on analysis of a textual representation of the content, computing a score for each of the sentences indicating a relation of the respective sentence to each of the topics, selecting a plurality of sentence subsets each comprising one or more sentences having a highest score with respect to a receptive one of the topics, selecting a plurality of video sections of the video stream each mapped to the one or more sentences of a respective sentence subset, and creating a video clip by merging the plurality of video sections each relating to one of the plurality of topics.

17 Claims, 3 Drawing Sheets

CREATING AUTOMATICALLY A SHORT CLIP SUMMARIZING HIGHLIGHTS OF A VIDEO STREAM

BACKGROUND

The present invention, in some embodiments thereof, relates to creating automatically a video clip summarizing highlights of a video stream, and, more specifically, but not exclusively, to creating automatically a short video clip summarizing highlights of a significantly longer video stream based on topics identified in the video stream.

Video recordings of events, scenes and/or the like is constantly growing as it is applied in a plurality of market segments, applications, services, platforms and systems, for example, security, public order, autonomous vehicles, gaming, education, healthcare, business conference calls and many more.

Moreover, the extent of video recording has significantly increased with the expansion of online sessions which have become highly popular in recent years, with a huge increase during the COVID-19 pandemic, in many of these applications ranging from eLearning, through business meetings to support and healthcare sessions.

SUMMARY

It is an object of the present invention to provide, methods, systems and software program products for automatically creating a short video clip summarizing highlights of a long video stream by identifying main topics (which may be physical, virtual, and/or abstract) in the video stream, selecting from the video stream subsets of frames for the topics and merging the subsets of frames to create the short video clip. The foregoing and other objects are achieved by the features of the independent claims. Further implementation forms are apparent from the dependent claims, the description and the figures.

According to a first aspect of the present invention there is provided a method of creating automatically a short video clip summarizing highlights of a long video stream, comprising using one or more processors for:

Identifying a plurality of topics in a video stream based on analysis of a content of the video stream.

Extracting a plurality of sentences based on analysis of a textual representation of the content.

Computing a score for each of the plurality of sentences indicating a relation of the respective sentence to each of the plurality of topics.

Selecting a plurality of sentence subsets from the plurality of sentences, each of the plurality of sentence subsets comprising one or more sentences having a highest score with respect to a receptive one of the plurality of topics.

Selecting a plurality of video sections of the video stream each mapped to the one or more sentences of a respective one of the plurality of sentence subsets.

Creating a video clip by merging the plurality of video sections each relating to one of the plurality of topics.

According to a second aspect of the present invention there is provided a system for creating automatically a short video clip summarizing highlights of a long video stream, comprising one or more processors configured to execute a code. The code comprising:

Code instructions to identify a plurality of topics in a video stream based on analysis of a content of the video stream.

Code instructions to extract a plurality of sentences based on analysis of a textual representation of the content.

Code instructions to compute a score for each of the plurality of sentences indicating a relation of the respective sentence to each of the plurality of topics.

Code instructions to select a plurality of sentence subsets from the plurality of sentences, each of the plurality of sentence subsets comprising one or more sentences having a highest score with respect to a receptive one of the plurality of topics.

Code instructions to select a plurality of video sections each mapped to the one or more sentences of a respective one of the plurality of sentence subsets.

Code instructions to create a video clip by merging the plurality of video sections each relating to one of the plurality of topics.

According to a third aspect of the present invention there is provided a computer program product for creating automatically a short video clip summarizing highlights of a long video stream, comprising a non-transitory medium storing thereon computer program instructions which, when executed by one or more hardware processors, cause the one or more hardware processors to:

Identify a plurality of topics in a video stream based on analysis of a content of the video stream.

Extract a plurality of sentences based on analysis of a textual representation of the content.

Compute a score for each of the plurality of sentences indicating a relation of the respective sentence with each of the plurality of topics.

Select a plurality of sentence subset from the plurality of sentences, each of the plurality of sentence subsets comprising one or more sentences having a highest score with respect to a receptive one of the plurality of topics.

Select a plurality of video sections each mapped to the one or more sentences of a respective one of the plurality of sentence subsets.

Create a video clip by merging the plurality of video sections each relating to one of the plurality of topics.

In a further implementation form of the first, second and/or third aspects, each of the plurality of topics is a member of a group consisting of: a physical object, a virtual object, and an abstract object.

In a further implementation form of the first, second and/or third aspects, the content comprises one or more members of a group consisting of: visual content, audible content, and text content.

In a further implementation form of the first, second and/or third aspects, one or more of the plurality of topics is identified based on visual analysis of visual content of one or more of a plurality of frames of the video stream.

In a further implementation form of the first, second and/or third aspects, one or more of the plurality of topics is identified based on analysis of audible content of the video stream.

In an optional implementation form of the first, second and/or third aspects, one or more of the plurality of topics is identified based on analysis of metadata associated with one or more of a plurality of frames of the video stream.

In an optional implementation form of the first, second and/or third aspects, one or more of the plurality of topics is predefined.

In a further implementation form of the first, second and/or third aspects, the textual representation is generated based on one or more data conversions. The one or more data conversions are members of a consisting of: sound to text (STT), and optical character recognition (OCR).

In a further implementation form of the first, second and/or third aspects, the textual representation is analyzed using natural languages processing (NLP).

In a further implementation form of the first, second and/or third aspects, the relation of each sentence to the respective topic is estimated based on one or more metrics. The one or more metrics are members of a group consisting of: a distance of the respective sentence form a previous sentence related to the respective topic, a punctuation mark included in the respective sentence, and an importance of the respective topic, wherein the distance is expressed by a time gap in the video stream between the respective sentences.

In an optional implementation form of the first, second and/or third aspects, one or more of the plurality of sentence subsets are selected for one or more of the plurality of topics based on a graph created for the textual representation by:
  Creating the graph by associating each of a plurality of vertices of the graph with a respective one of the plurality of sentences.
  Computing the score for each vertex of the plurality of vertices with respect to the respective topic.
  Identifying a root vertex having a highest score.
  Selecting a subset of vertices comprising the root vertex and one or more child vertices of the root vertex such that the root vertex and the one or more child vertices have a highest aggregated score.
  Selecting the one or more sentence subsets to include the sentences associated with the root vertex and the one or more child vertices.

In an optional implementation form of the first, second and/or third aspects, the score computed for one or more of the plurality of sentences with respect to one or more of the plurality of topics is adjusted based on a sentiment expressed in the one or more sentences. The sentiment is identified based on analysis of the content, the analysis is a member of a group consisting of: visual analysis, audio analysis and text analysis.

In an optional implementation form of the first, second and/or third aspects, the score is computed for each of the plurality of sentences after splitting the video stream to a plurality of segments. The video stream is split to the plurality of segments using one or more clustering algorithms trained to cluster the video stream to segments based on a plurality of embedding vectors, each of the plurality of embedding vectors comprises a plurality of features extracted from the content of the video stream.

In a further implementation form of the first, second and/or third aspects, the video clip is created by merging the plurality of video sections subsets according to an order of appearance of each of the plurality of topics in the video stream.

In a further implementation form of the first, second and/or third aspects, the video clip is created by merging the plurality of video sections according to a priority score assigned to each of the plurality of topics.

In an optional implementation form of the first, second and/or third aspects, one or more hyperlinks are embedded in one or more frames of one or more video sections relating to one or more of the plurality of topics. The one or more hyperlinks associate the one or more frames with one or more segments of the video stream relating to the one or more topics.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
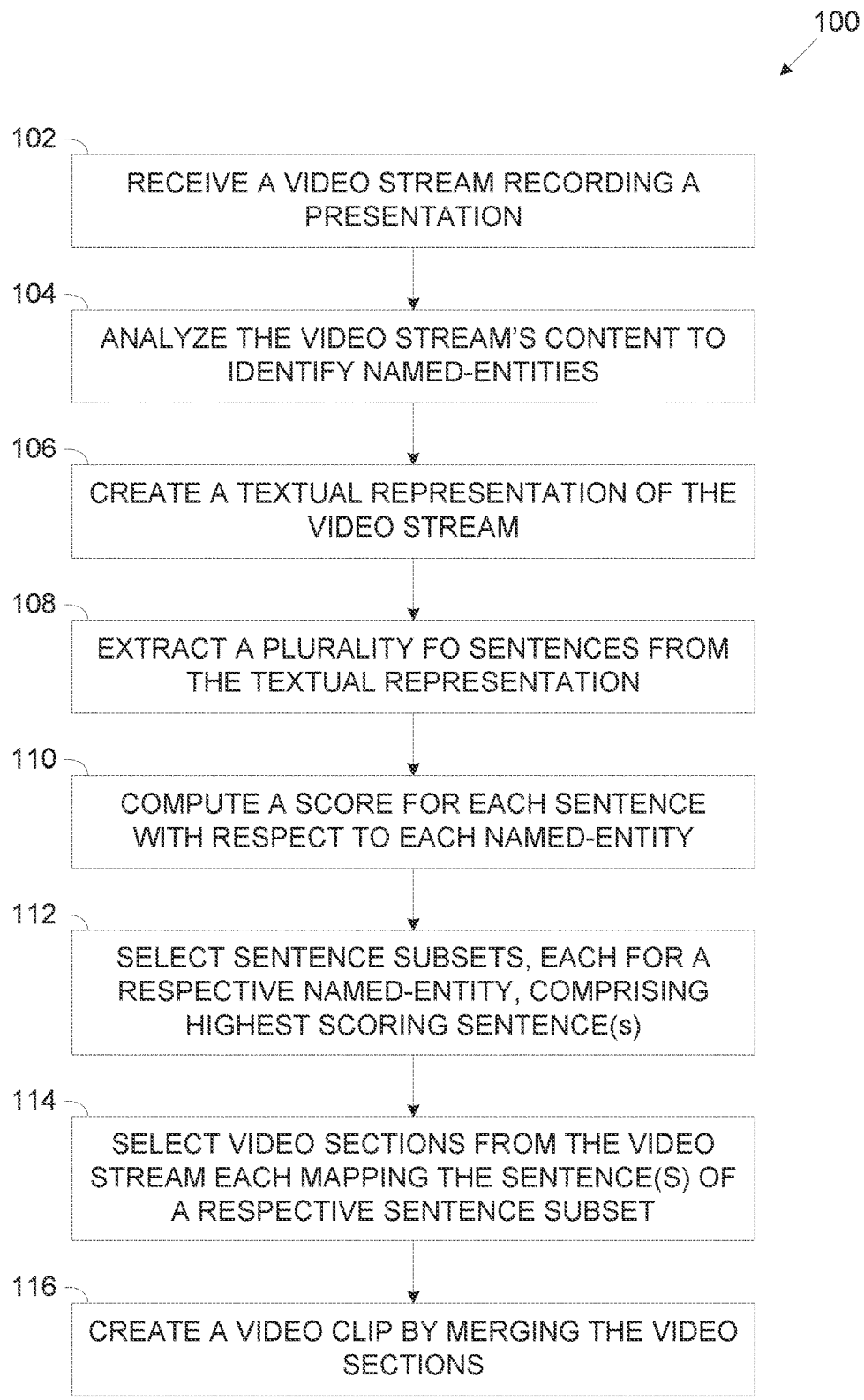
FIG. 1 is a flowchart of an exemplary process of automatically creating a short video clip summarizing highlights of a long video stream, according to some embodiments of the present invention.

The present invention, in some embodiments thereof, relates to creating automatically a video clip summarizing highlights of a video stream, and, more specifically, but not exclusively, to creating automatically a short video clip summarizing highlights of a significantly longer video stream based on topics identified in the video stream.

According to some embodiments of the present invention, there are provided methods, systems and computer program products for analyzing content of a video stream to identify a plurality of topics presented in the video stream, select a short video section relating to one or more of the topics and merging the video sections summarizing the topics to create a significantly short video clip comprising highlights of the much longer video stream.

The video stream which may comprise a plurality of frames, audio and optionally metadata may typically depict one or more long sessions, for example, an interaction between people such as, for example, a frontal meeting, lecture, presentation or class, an online meeting (e.g. zoom, etc.), an eLearning class, a customer support session, and/or the like. However, the video stream may optionally record one or more other sessions, for example, a scene such as, for example, an area, an environment of vehicle recorded from the vehicle and/or the like.

The content of the video stream, for example, visual content, audible content, and/or textual content, optionally coupled with metadata if available in the video stream may be analyzed to identify a plurality of topics which may comprise physical objects (object, person, location, event, etc.), virtual objects (name, avatar, online event, etc.) and/or abstract topics (subject, term, keyword, idea, etc.).

The content of the video stream may be further analyzed to create a textual representation of the video stream. One or more tools, for example, Natural Language Processing (NLP) may be applied to extract a plurality of sentences from the textual representation.

A score may be computed for each of the sentences with respect to one or more of the topics detected in the video stream. The score may be indicative of a relation of the respective sentence to the respective topic, for example, the topic is mentioned in the sentence, a reference to the topic is included in the sentence, the sentence relates to an originator (e.g., speaker, slide, etc.) of the topic and/or the like. One or more metrics, measures and/or models described in detail hereon after may be applied for computing and/or adjusting the scores for the sentences.

Optionally, the score of one or more of the sentences may be adjusted based on sentiments identified in the video stream (e.g. audio sound track, facial expression, etc.) with respect to these sentences.

A plurality of sentence subsets relating to at least some of the plurality of topics may be created (selected) such that each sentence subset may comprise one or more sentences having highest score with respect to the receptive topic.

A plurality of video sections may be then selected based on the plurality of sentence subsets. Each of the video sections may thus relate to a respective one of the at least some topics and may comprises one or more frames, audio and/or metadata mapping the sentences included in the respective sentence subset which relate to the respective topic. In other words, each video section may include partial content form the video stream which presents the topic to which the sentences of one of the sentence subsets relate. As such each video section presents a summary of a respective one of the topics presented and detected in the video stream.

The plurality of video sections may be then merged to create the short video clip, for example, according to an order of appearance of their related topics in the video stream, according to a priority of their related topics and/or the like and the ort video clip summarizing the highlights of the video stream relating to the topics may be output for view by one or more users.

Moreover, one or more hyperlinks may be embedded in the video clip to associate one or more of the topics depicted in the video clip with one or more segments of the video stream which present and/or depict the respective topic(s) in more detail, depth, fullness and/or thoroughness.

Creating the video clip summarizing highlights of the video stream, specifically a video clip comprising partial and very limited amount of content of the video stream relating to topics identified in the video stream may present significant advantages and benefits.

First, the long video stream may comprise many irrelevant, redundant, duplicated and or idle periods during which no new, relevant and/or effective information is presented, expressed and/or discussed. Users watching the video stream in order to extract relevant and/or meaningful information from the video stream, specifically with respect to topics presented and/or discussed in the video stream may therefore waste significant time in watching the entire video stream. Watching the highlights video clip may significantly reduce the time needed for the users to learn the relevant information relating to the topics.

This advantage may be of extreme benefit for users who may need to review a plurality of video streams each significantly long, for example, a manager who needs to follow up on a plurality of meetings taking place between members of his team, an auditor or a supervisor who needs to monitor and/or audit performance of a plurality of stuff members and/or the like. For example, assuming a certain manager of a certain R&D group wants to catch up on a plurality of team meetings held by a plurality of teams of the group. Monitoring the entire video streams recording the meetings which may be each long (e.g. 1 hour) may be practically impossible for the manager due to lack of time. However, the video clips created automatically for the video streams may be extremely shorter (e.g. 3 minutes) thus significantly reducing the time needed for the manager to catch up with the topics discussed and/or presented in the meetings. In another example, assuming a certain customer support supervisor needs to monitor and evaluate performance of a plurality of customer support people conducting a plurality of support sessions with a plurality of customers every day. Again, it may be impossible for the supervisor to watch all video streams of all of the support persons. Creating a very short video clip for each support session (e.g. one minute, two minutes, etc.) may significantly reduce the time needed for the supervisor to monitor the video streams and evaluate the support personnel accordingly.

Moreover, embedding hyperlinks to segments of the video stream based on the topics selected for the video clip may enable the user(s) who wishes to learn further details on a specific topic to get into the original video stream at the exact point which is most relevant, informative and/or effective with respect to the specific topic without wasting time on irrelevant video stream periods which are irrelevant to the specific topic.

Furthermore, computing the score for each of the sentences extracted from the textual representation of the video stream and selecting highest scoring sentences with respect to each of the topics may yield a significantly small sentence subset for each topic which may comprise only very few sentences but may yet present and/or include the most relevant, accurate and/or efficient information relating to the respective topic.

Also, adjusting the score of one or more of the sentences relating to a certain topic according to sentiment(s) expressed in relation to these sentences may further increase relevancy, accuracy and/or efficiency of the information included in these sentences with respect to the certain topic. This is because, human sentiment expressed while talking may be highly expressive and indicative of the significant, important and/or notable content or interaction.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of automatically creating a short video clip summarizing highlights of a long video stream, according to some embodiments of the present invention.

An exemplary process 100 may be executed for creating, automatically, a short video clip summarizing highlights of a much longer video stream by identifying main topics in the video stream, which may be physicals, virtual and/or abstract topics, for example, a person, an entity, an event, a location, a subject, a brand, a keyword, an idea, a concept, a term, and/or the like, selecting from the video stream a plurality of subsets of frames each for a respective topic and merging the frame subsets to create the short video clip.

Figure 2:
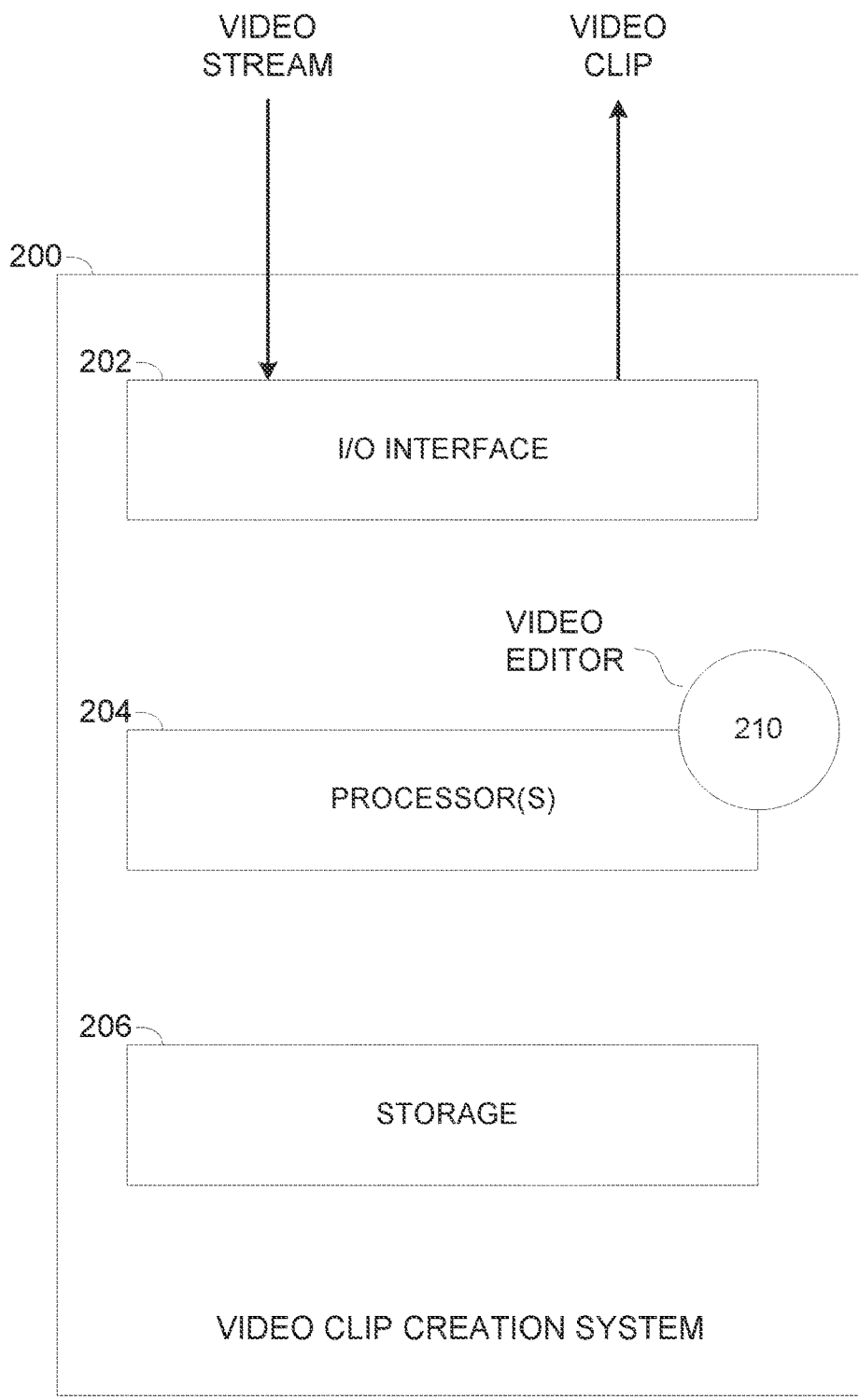
FIG. 2 is a schematic illustration of an exemplary system for automatically creating a short video clip summarizing highlights of a long video stream, according to some embodiments of the present invention.

Reference is also made to FIG. 2, which is a schematic illustration of an exemplary system for automatically creating a short video clip summarizing highlights of a long video stream, according to some embodiments of the present invention.

An exemplary video clip creation system 200, for example, a computer, a server, a computing node, a cluster of computing nodes and/or the like may include an Input/Output (I/O) interface 202, a processor(s) 204 for executing a process such as the process 100 and a storage 206 for storing code (program store) and/or data.

The I/O interface 202 may include one or more network interfaces for connecting to one or more wired and/or wireless networks, for example, a Local Area Network (LAN), a Wireless LAN (WLAN), a Wide Area Network (WAN), a Municipal Area Network (MAN), a cellular network, the internet and/or the like. The I/O interface 202 may further include one or more local interfaces, for example, a Universal Serial Bus (USB), a serial port, a Radio Frequency (RF) interface and/or the like for connecting to one or more local resources, for example, an attachable storage device, another computing device and/or the like.

The processor(s) 204, homogenous or heterogeneous, may include one or more processing nodes arranged for parallel processing, as clusters and/or as one or more multi core processor(s). The storage 206 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 206 may further comprise one or more local and/or remote network storage resources, for example, a storage server, a Network Attached Storage (NAS), a network drive, and/or the like accessible via one or more networks through the I/O interface 202.

Via the I/O interface 202, the video clip creation system 200 may obtain, for example, receive, fetch and/or retrieve one or more video streams presenting one or more topics in one or more forms, for example, visually, audibly, textually and/or a combination thereof. For example, the video clip creation system 200 may receive one or more video streams from one or more remote network resources via one or more networks to which the I/O interface 202 is connected. In another example, the video clip creation system 200 may retrieve one or more video streams from one or more attachable storage devices (e.g. memory stick) attached to the I/O interface 202. Optionally, the video clip creation system 200 may fetch one or more video streams stored in one or more of its local storage resources, for example, the storage 206.

The processor(s) 204 may execute one or more software modules, for example, a process, a script, an application, an agent, a utility, a tool, an Operating System (OS) and/or the like each comprising a plurality of program instructions stored in a non-transitory medium such as the storage 206 and executed by one or more processors such as the processor(s) 204.

Optionally, the processor(s) 204 may further, integrate, utilize and/or facilitate one or more hardware elements (modules) integrated and/or utilized in the video clip creation system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 204 may therefore execute one or more functional modules implemented using one or more software modules, one or more of the hardware modules and/or combination thereof. For example, the processor(s) 204 may execute a video editor 210 functional module for executing the process 100 to automatically create one or more short video clips each summarizing highlights of a respective one of the received video stream(s).

Optionally, the video clip creation system 200 and/or the video editor 210 are provided, utilized and/or implemented using one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

For brevity, the process 100 is described for creating a short clip for a single video stream. This, however, should not be construed as limiting since the process 100 may be easily and intuitively expanded, as may be apparent to a person skilled in the art, to create a plurality of short video clips each for a respective one of a plurality of video streams.

As shown at 102, the process 100 starts with the video editor 210 receiving, retrieving, fetching and/or otherwise obtaining a video stream comprising a plurality of consecutive frames, audio and optionally metadata.

As described herein before, the video editor 210 may obtain the video stream from one or more source. For example, the video editor 210 may receive the video stream from one or more remote network resources via one or more networks to which the I/O interface 202 is connected. In another example, the video editor 210 may fetch the video stream from one or more local storage resources of the training system 200, for example, the storage 206. In another example, the video editor 210 may retrieve the video stream from one or more attachable storage resources attached to the I/O interface 202.

The video stream may present and/or record one or more sessions, for example, a frontal meeting, an online meeting (e.g. zoom, etc.), an eLearning session, a class, a lecture, a presentation, a customer support session and/or the like. However, the video stream may further present and/or record one or more scenes. For example, the video stream may present and/or record one or more static scenes, for example, an interior (indoor) view of an area, an outer (external) view of an area, a street view, a road view and/or the like. In another example, the video stream may present and/or record one or more dynamic scenes, for example, a scene captured by a vehicle (e.g., car, bicycle, train, drone, etc.), for example, an external view (environment) of the vehicle, an internal view of the vehicle (e.g., cabin, dashboard, etc.), and/or the like.

In particular, the video stream may be typically significantly long, for example, 30 minutes, 60 minutes, 90 minutes, 120 minutes and more.

As shown at 104, the video editor 210 may analyze content of the video stream to identify a plurality of topics present in the video stream which may comprise physical objects, virtual objects and/or abstract topics.

For example, the topics may comprise one or more physical objects also designated named-entities in the domain of information extraction, for example, an object, a person, an entity, an event, a location, a subject, a brand, and/or the like. In another example, the topics may comprise one or more virtual objects which may exist, seen and/or occur online, for example, an online event, an avatar, and/or the like. In another example, the topics may comprise one or more abstract topics having no physical existence, for example, a keyword, a term, an idea, a concept and/or the like.

In order to identify the topics present (existing) in the video stream, the video editor 210 may analyze the content of the video stream, for example, visual content, audible (audio) content, and/or text content using one or more algorithms, tools and/or methods (collectively designated algorithms) as known in the art.

For example, the video editor 210 may apply one or more visual analysis algorithms, for example, image processing, computer vision and/or the like to analyze the visual content (video frames) of the video stream and identify one or more topics visually depicted in one or more frames of the video stream, for example, a physical topic, a virtual topic and/or the like. For example, assuming the video stream is a recordation of a certain online meeting, for example, a zoom meeting. In such case, the video editor 210 may analyze the visual content of the video stream, specifically the video frames to identify one or more topics seen in the video frame(s), for example, one or more persons participating in the meeting. In another example, based on the visual analysis, the video editor 210 may further identify one or more additional topics visually depicted in the video frames, for example, an object such as, for example, a product, a gadget, an item and/or the like presented, used and/or the like by one or more of the participants.

In another example, the video editor 210 may apply one or more audio and/or signal analysis algorithms, for example, speech recognition, sound analysis, Sound to Text (STT), and/or the like to analyze the audible content (soundtrack) of the video stream to identify one or more topics expressed via sound and/or speech captured in the video stream, for example, a physical topic, a virtual topic, an abstract topic and/or the like. Continuing the previous example, assuming the video stream is the recordation of the certain online meeting. In such case, the video editor 210 may analyze the audible (audio) content of the video stream, specifically the video stream's soundtrack to identify one or more topics discussed in the meeting, for example, another person not participating in the online meeting, an idea, a term and/or a subject such as, for example, budget, salary, recruitment, timeline, resource allocation, and/or the like.

In another example, the video editor 210 may apply one or more text analysis algorithms, for example, text recognition such as, for example, Optical Character Recognition (OCR), hand writing recognition and/or the like to identify one or more topics expressed via text captured in the video stream, for example, a physical topic, a virtual topic, an abstract topic and/or the like. Continuing the previous example, assuming the video stream is the recordation of the certain online meeting. In such case, the video editor 210 may analyze textual content detected in the video stream, for example, one or more slides, documents, written material and/or the like presented during the certain meeting to identify one or more topics presented during the meeting, for example, an idea, a term and/or a subject such as, for example, budget, salary, recruitment, timeline, resource allocation, and/or the like. In another example, the video editor 210 may analyze textual content of one or more text messages exchanged during the meeting between the participating persons to identify one or more topics discussed between the participants.

Optionally, the video editor 210 may identify one or more topics based on analysis of metadata associated with the video stream, for example, metadata associated with one or more of the frames of the video stream. The metadata may be integrated in the video stream itself and/or included in one or more associated media records, for example, a file, a table, a list, a database, and/or the like. Continuing the previous example, assuming the video stream is the recordation of the certain online meeting. Further assuming the video stream includes metadata relating (associated) to the entire video stream and/or to one or more specific frames. In such case, based on analysis of the associated metadata, the video editor 210 may identify one or more topics, for example, one or more timing parameters relating to the online meeting (e.g., start time, end time, duration, time zone of at the location(s) of the participant(s), etc.), a company to which one or more of the participants belongs, a geographical location of one or more of the participants and/or the like.

Optionally, the video editor 210 may identify one or more predefined topics which may indicate these topics are important. Such predefined topics may be defined, for example, by one or more users. In another example, one or more predefined topics may be defined by one or more rules applied to configure operation of the video editor 210.

As shown at 106, the video editor 210 may create a textual representation the video stream, specifically, a textual representation of the content of the video stream, for example, the visual content, the audible content and the text content. The video editor 210 may apply one or more algorithms for creating the textual representation of the video stream.

For example, the video editor 210 may apply one or more audio analysis algorithms, for example, speech recognition, sound analysis, STT, and/or the like to convert audible content of the video stream to text. The video editor 210 may then use the text form of the audio content to create, update and/or adjust the textual representation of the video stream.

In another example, the video editor 210 may apply one or more text analysis algorithms, for example, text recognition such as, OCR, hand writing recognition and/or the like to identify, extract and/or collect text content of the video stream. The video editor 210 may then use the text content to create, update and/or adjust the textual representation of the video stream.

In another example, the video editor 210 may apply one or more visual analysis algorithms, for example, computer vision, image processing and/or the like to express visual content of the video stream in text form. The video editor 210 may then use the text form of the visual content to create, update and/or adjust the textual representation of the video stream.

As shown at 108, the video editor 210 may extract a plurality of sentences from the textual representation created for the video stream.

The video editor 210 may analyze the textual representation using one or more methods, tools and/or algorithms as known in the art to identify and extract the plurality of sentences from the textual representation of the video stream.

For example, the video editor 210 may apply one or more Natural Languages Processing (NLP) algorithms to interpret, recognize, infer, estimate and/or determine a textual structure of the textual representation, for example, paragraphs, sentences, keywords, grammatical sections, comments, quotations, and/or the like and may extract sentences accordingly. The NLP may determine the textual structure of the textual representation, as known in the art, based on meaning of the sections, paragraphs, sentences sections, etc., based on relations between them, based on punctuation marks identified in the textual representation, and/or the like.

In another example, the video editor 210 may apply one or more Machine Learning (ML) Models, for example, a neural network, a Support Vector Machine (SVM) and/or the like trained, as known in the art, to interpret, infer, classify and/or estimate the textual structure of textual representations. The ML Model(s) may be trained in one or more supervised, semi-supervised and/or unsupervised training sessions using one or more training datasets which may be based on one or more texts, specifically textual representations of video streams. Moreover, the ML Model(s) may be trained using training dataset(s) constructed based on one or more textual representations of one or more video streams significantly similar to the received video stream, for example, a recordation of a class, a lecture, a meeting, a customer support session and/or the like.

As shown at 110, the video editor 210 may compute a score for each of the plurality of sentences extracted from the textual representation with respect to each of the plurality of topics identified in the video stream.

The scores computed for each sentence may therefore indicate a relation of the respective sentence to each of the topics, for example, the topic is contained in the sentence, a derivative of the topic is contained in the sentence, a reference to the topic is made in the sentence and/or the like. As such, a high score computed for a certain sentence with respect to a first topic may indicate a strong relation of the certain sentence to the first topic while a low score computed for the certain sentence with respect to a second topic may indicate a weak relation of the certain sentence to the second topic.

The video editor 210 may apply one or more methods and/or algorithms for computing the score for the sentences extracted from the textual representation of the video stream, for example, based on measures and/or metrics, based on a graph model of the sentences, and/or the like.

In a first exemplary metrics, the video editor 210 may compute the score of one or more of the extracted sentences with respect to one or more of the topics based on a distance of the respective sentence from a previous sentence extracted from the textual representation which also relates to the respective topic. The distance may express a time gap in the video stream between the respective sentences, i.e., the time gap between the previous and later sentences. However, in an alternative and/or complementary mode, the distance may express a number of sentences between the previous and later sentences. For example, the video editor 210 may compute a higher score for a certain sentence relating to a certain topic which is closer in terms of time gap and/or number of sentences to a previous (most recent) sentence relating to the certain topic. In contrast, the video editor 210 may compute a lower score for the certain sentence relating to the certain topic which is further from the previous (most recent) sentence relating to the certain topic. In another example, assuming a certain sentence relating to both a first topic and a second topic has a distance A in terms of time gap and/or number of sentences to a first previous sentence relating to the first topic and a distance B to a second previous sentence relating to the second topic. In such case, the video editor 210 may compute for the certain sentence a higher score with respect to the first topic and a lower score with respect to the second topic.

In a second exemplary metrics, the video editor 210 may compute the score of one or more of the extracted sentences with respect to one or more of the topics based on importance of the respective topic. The video editor 210 may use one or more algorithms to estimate and/or determine the importance of one or more topics, for example, Term Frequency-Inverse Document Frequency (TF-IDF) and/or the like. The TF-IDF, as known in the art, is a numerical statistic intended to reflect an important of a term (word), topic in this case, to the textual representation which may be used as a weighting factor that increases proportionally to the number of times the word (topic) appears in the textual representation. The video editor 210 may therefore compute a higher score for sentences relating to higher importance topics, i.e., topics which appear with higher frequency in the textual representation while computing a lower score for sentences relating to lower importance topics which appear with lower frequency in the textual representation.

In a third exemplary metrics, the video editor 210 may compute the score of one or more of the extracted sentences based on one or more punctuation marks detected in the respective sentence, for example, a question mark, a punctuation mark, and/or the like. For example, the video editor 210 may compute a higher score for a certain sentence comprising a punctuation mar mark compared to a similar sentence which does not include an exclamation mark.

As stated herein before, in some embodiments, the video editor 210 may compute the score of one or more of the extracted sentences based on a graph model constructed by associating vertices (nodes) of the graph with the extracted sentences.

The video editor 210 may construct the graph for the textual representation by mapping (associating) the plurality of sentences to a plurality of vertices of the graph and connecting between vertices based on one or more attributes detected, estimated and/or determined for one or more of the topics and their related sentences optionally according to one or more predefined rules and/or learned rules. For example, a certain attribute applied by the video editor 210 include a type of one or more of the topic (e.g. person, subject, term, etc.). In another example, another attribute applied by the video editor 210 may be the speaker(s) and/or originator(s) of one or more of the sentences. In another example, another attribute applied by the video editor 210 may comprise the content of one or more of the sentences (information, question, argument, etc.). In another example, another attribute applied by the video editor 210 may be an importance of the topic(s), for example, predefined topic(s), high appearing topics and/or the like.

After computing the attributes for the plurality of sentences, the video editor 210 may create the graph accordingly by mapping the sentences to vertices and connecting the vertices via edges based on the topics the sentences relate and the values of their attributes, for example, same topic, topic importance, common speaker, similar type, and/or the like.

The video editor 210 may then compute the score for the topics and for each of the vertices (sentences) based on the graph model created for the textual representation. For example, the video editor 210 may apply NLP to compute the score for the topics and/or sentences. The video editor 210 may further traverse the graph backwards from its last (leaf) vertices to its beginning (root) vertices along the connected vertices and adjust the score of each topic detected in the sentences mapped by the vertices according to their frequency of appearance in the graph.

For example, assuming the video editor 210 detects three topics in the graph, for example, "budget", "salary" and "recruitment", it may first compute and/or assign a basic score for each of the three topics.

The video editor 210 may then traverse back the graph from the lowest (last) vertex mapping a sentence relating to one of the topics, for example, "salary" along the path of connected vertices to a higher level (previous) vertex mapping a sentence relating to the topic "salary" and so on to the highest (first) vertex mapping a sentence relating to the topic "salary". Assuming the video editor 210 detected three vertices relating to the topic "salary", the video editor 210 may assign the basic score to the topic "salary" based on the lowest level vertex mapping the last sentence relating to the topic "salary". The video editor 210 may adjust, specifically increase the score of the topic "salary" based on the next higher vertex mapping the previous sentence relating to the topic "salary" and may further increase the score of the topic "salary" based on the highest higher vertex mapping the first sentence relating to the topic "salary".

Assuming that during its backwards traverse for the topic "budget", i.e., along the path connecting vertices relating to the topic "budget", the video editor 210 detects five sentences relating to the "budget. In such case, the video editor 210 may assign the basic score to the topic "budget" based on the lowest level vertex mapping the last sentence relating to the topic "budget, and may further adjust the score of the topic "budget" based on each additional vertex mapping the topic "budget" further up the graph.

In such case, since more vertices relate to the topic "budget", the final score computed by the video editor 210 for the topic "budget" may be higher than the score computed for the topic "salary".

The video editor 210 may then compute the score for each of the sentences based on the score of their related topics. The video editor 210 may further compute and/or adjust the score of one or more of the sentences based on one or more of the metrics detected for the respective sentences, for example, their distance from previous vertices (sentences) in the graph, their content, i.e., punctuation marks, and/or the like.

Optionally, the video editor 210 may adjust the score computed (calculated) for one or more of the plurality of sentences with respect to one or more of the plurality of topics based on one or more sentiments, for example, anger, anxiety, rudeness, joy, passion and/or the like expressed in the respective sentence.

The video editor 210 may identify the sentiments based on analysis of the content of the video stream in which the respective sentence is expressed and/or presented, for example, visual analysis, audio analysis, text analysis and/or the like. For example, for a certain sentence expressed by a certain speaker, the video editor 210 may apply speech analysis to analyze a section of the video stream in which the certain speaker says the sentence to identify, estimate, and/or determine one or more sentiments expressed by the voice of the certain speaker. In another example, for a certain sentence expressed by a certain speaker, the video editor 210 may apply visual analysis to analyze one or more frames of the video stream depicting the face of the certain speaker while saying the sentence to identify, estimate, and/or determine one or more sentiments expressed by facial expression(s) of the certain speaker. In another example, for a certain sentence presented in written from, for example, a certain presentation slide, the video editor 210 may apply text analysis (e.g. OCR, etc.) to analyze one or more frames of the video stream depicting the certain slide to identify, estimate, and/or determine one or more sentiments expressed by one or more textual emphasis means, for example, a punctuation mark, an adjective and/or the like.

Optionally, before computing the score for each of the topics and sentences, the video editor 210 splits the video stream to a plurality of segments. After splitting the video stream, the video editor 210 may compute the score for the topics and sentences as described herein before in steps 104 to 110 of the process 100 for each of the video segments.

The video editor 210 may apply one or more algorithms for splitting the video stream to the plurality of segments. For example, the video editor 210 may use one or more clustering algorithms trained to cluster the video stream to segments based on a plurality of embedding vectors as known in the art where each of the plurality of embedding vectors may comprise a plurality of features extracted from the content of the video stream, for example, topics, objects, background, theme, shape, outline, meaning and/or the like.

As shown at 112, the video editor 210 may select a plurality of sentence subsets each relating to one of at least some of the plurality of topics based on the score computed for the sentences. In particular, each of the sentence subsets relating to a respective topic may comprise one or more sentences having highest score with respect to the respective topic.

For example, assuming the video editor 210 used one or more of the metrics to compute the score of each of the sentences with respect to each of the topics, for each of the at least some topics, the video editor 210 may select a respective sentence subset comprising one or more sentences having the highest score with respect to the respective topic.

Assuming the graph model is created to model the textual representation of the video stream, after computing and optionally adjusting the score for each vertex in the graph with respect to each of the topics, the video editor 210 may identify a root vertex having a highest score with respect to each of one or more of the topics. The video editor 210 may then select one or more subsets of vertices each relating to a respective topic and comprising the root vertex identified for the respective topic and one or more child vertices of the root vertex.

In particular, the video editor 210 may select the root vertex and the child vertex(s) which aggregating their scores yield (have) a highest aggregated score. In other words, each subset of vertices relates to a certain topic identified in the textual representation and comprises vertices mapping (associated with) sentences relating to the certain topic which yield the highest aggregated score.

The video editor 210 may then select one or more sentence subsets each for a respective one of the subsets of vertices such that each sentence subset comprises the sentences associated (mapped) with the vertices of the respective subset of vertices, i.e., the root vertex and the child vertex(s) of the respective subset of vertices.

As shown at 114, the video editor 210 may select a plurality of video sections of the video stream each mapped to the sentence(s) of a respective one of the plurality of sentence subsets. In particular, each of the video sections may be significantly short, for example, 10 seconds, 20 seconds, 30 seconds and/or the like and may thus comprise a very small and limited number of frames.

For each sentence subset, the video editor 210 may trace each sentence of the respective sentence subset to one or more frames of the video stream mapping the respective sentence, i.e., frame(s) in which the respective sentence is expressed, presented and/or detected. The video editor 210 may then select a respective video section accordingly which comprises one or more of the frames mapping each sentence of the respective sentence subset.

As shown at 116, the video editor 210 may create a video clip by merging the plurality of video sections each relating to one of the plurality of topics.

The video editor 210 may apply one or more methods and/or paradigms for merging the plurality of video sections to create the video clip. For example, the video editor 210 may merge the plurality of video sections subsets according to an order of appearance of their related topic in the video stream. This means that video section(s) relating to topic(s) which appear earlier in the video stream may precede in the video clip other video section(s) relating to topic(s) which appear later in the video stream. In another example, the video editor 210 may merge the plurality of video sections subsets according to a priority score assigned to each of at least some of the plurality of topics. As such video section(s) relating to higher priority topic(s) may precede in the video clip video section(s) relating to lower priority topic(s). The priority of the topics may be set using one or more techniques. For example, the priority of one or more of the topics may be predefined, for example, by a user. In another example, the priority of one or more of the topics may be set according to an importance of the respective topic, for example, as derived from TF-IDF, form NLP analysis, and/or the like.

Optionally, the video editor 210 embeds in the video clip one or more hyperlinks relating to one or more of the plurality of topics. Specifically, the video editor 210 may embed one or more hyperlinks in one or more frames of one or more video sections (constituting the video clip) relating to one or more of the topics such that each of the hyperlinks may also relate to a respective one of the topics. Each hyperlink may associate (link, point) the respective frame of the respective video section in which the respective hyperlink is embedded with one or more segment of the video stream relating to the respective topic.

Selecting such a hyperlink when displayed during presentation of the video clip, for example, pressing it, hovering over it, and/or the like may enable viewing the associated (linked) video segment as known in the art.

Since each of the video sections may be significantly short the video clip combining the plurality of short video sections may also be significantly short, for example, one minute, three minutes, five minutes, and/or the like. One or more users may therefore watch the short video clip to catch the highlights of the video stream without the need to go through the entire video stream which may be very long and thus very time consuming.

Moreover, while watching the video clip, the user(s) may select one or more of the hyperlinks embedded in the video clip to view longer segments of the video stream relating to the topics associated with the embedded hyperlink(s). This however may be done selectively per topic without the need to go over the entire video stream to identify the relevant video segment.

Figure 3:
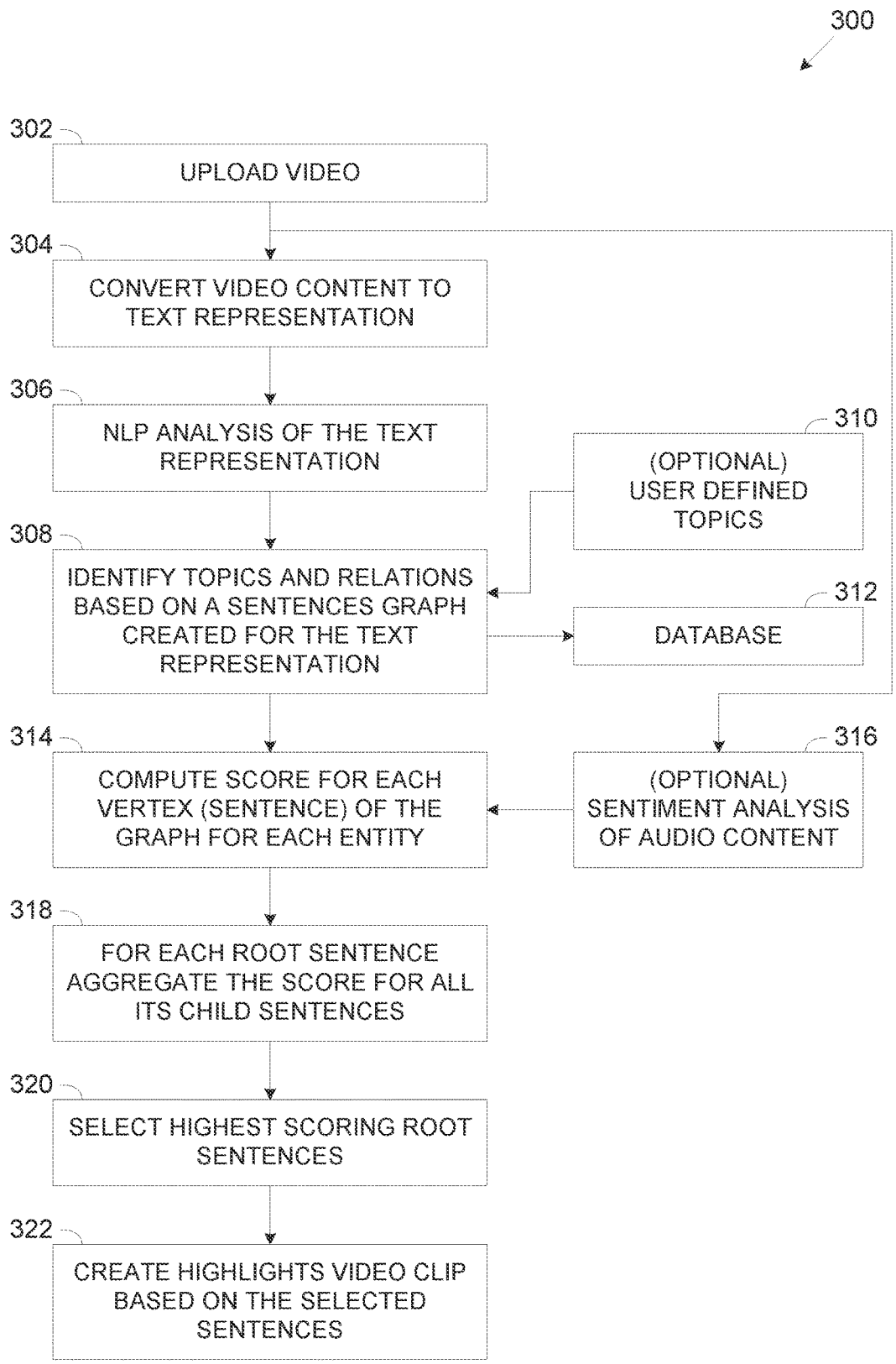
FIG. 3 is a schematic illustration of a sequence for automatically creating a short video clip summarizing highlights of a long video stream, according to some embodiments of the present invention.

Reference is now made to FIG. 3, which is a schematic illustration of a sequence for automatically creating a short video clip summarizing highlights of a long video stream, according to some embodiments of the present invention.

An exemplary sequence 300 may be followed by a video editor such as the video editor 210 executing a process such as the process 100 for automatically creating a short video clip summarizing highlights of a significantly longer video stream. In particular, the video editor 210 may apply the sequence 300 to construct the video clip from a plurality of short video sections each relating to a respective one of a plurality of topics identified in the video stream.

After the video stream is uploaded (302), the video editor 210 may analyze the content of the video stream and convert it to text format, i.e., create a textual representation for the video stream (304).

The video editor 210 may apply NLP to analyze the textual representation of the video stream (306) to identify a plurality of topics and relations based on a graph model comprising vertices mapping sentences extracted from the textual representation (308). Optionally, one or more of the topics may be predefined (310), for example, defined by one or more users. Optionally, the video editor 210 may save one or more of the topics, relations between topics and/or the like in one or more records, for example, a database, and/or the like (312) to support future analysis of one or more other video streams.

The video editor 210 may then compute a score for each of the sentences, for example, for each vertex in the graph mapping a respective sentence extracted from the textual representation (314). Optionally, the video editor 210 may adjust the score computed for one or more of the sentences based on sentiments extracted by analyzing the video stream (316).

The video editor 210 may further compute an aggregated score for each root sentence and its child sentences in the graph (sentence subset) with respect to one of the topics (318) and may select highest scoring root sentences (320).

Finally, the video editor 210 may create a highlights video clip comprising highlights of the video stream based on the sentences (322), specifically based on the sentence subsets by selecting and merging together a plurality of video sections of the video stream mapping the highest scoring sentences included in each sentence subset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms NLP algorithms, OCR algorithms, STT algorithms and Machine Learning (ML) models are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of creating automatically a short video clip summarizing highlights of a long video stream, comprising:
    using at least one processor for:
        identifying a plurality of topics in a video stream based on analysis of a content of the video stream;
        extracting a plurality of sentences based on analysis of a textual representation of the content;
        computing a score for each of the plurality of sentences indicating a relation of the respective sentence to each of the plurality of topics;
        selecting a plurality of sentence subsets from the plurality of sentences, each of the plurality of sentence subsets comprising at least one sentence having a highest score with respect to a receptive one of the plurality of topics, wherein at least one of the plurality of sentence subsets is selected for at least one of the plurality of topics based on a graph created for the textual representation by:
            creating the graph by associating each of a plurality of vertices of the graph with a respective one of the plurality of sentences,
            computing the score for each vertex of the plurality of vertices with respect to the respective topic,
            identifying a root vertex having a highest score,
            selecting a subset of vertices comprising the root vertex and at least one child vertex of the root vertex such that the root vertex and the at least one child vertex have a highest aggregated score, and
            selecting the at least one sentence subset to include the sentences associated with the root vertex and the at least one child vertex;
        selecting a plurality of video sections of the video stream each mapped to the at least one sentence of a respective one of the plurality of sentence subsets; and
        creating a video clip by merging the plurality of video sections each relating to one of the plurality of topics.

2. The method of claim 1, wherein each of the plurality of topics is a member of a group consisting of: a physical object, a virtual object, and an abstract object.

3. The method of claim 1, wherein the content comprises at least one member of a group consisting of: visual content, audible content, and text content.

4. The method of claim 1, wherein at least one of the plurality of topics is identified based on visual analysis of visual content of at least one of a plurality of frames of the video stream.

5. The method of claim 1, wherein at least one of the plurality of topics is identified based on analysis of audible content of the video stream.

6. The method of claim 1, further comprising identifying at least one of the plurality of topics based on analysis of metadata associated with at least one of a plurality of frames of the video stream.

7. The method of claim 1, further comprising identifying at least one predefined topic of the plurality of topics.

8. The method of claim 1, wherein the textual representation is generated based on at least one data conversion, the at least one data conversion is a member of a group consisting of: sound to text (STT), and optical character recognition (OCR).

9. The method of claim 1, wherein the textual representation is analyzed using natural languages processing (NLP).

10. The method of claim 1, wherein the relation of each sentence to the respective topic is estimated based on at least one metrics, the at least one metrics is a member of a group consisting of: a distance of the respective sentence from a previous sentence related to the respective topic, a punctuation mark included in the respective sentence, and an importance of the respective topic, wherein the distance is expressed by a time gap in the video stream between the respective sentences.

11. The method of claim 1, further comprising adjusting the score computed for at least one of the plurality of sentences with respect to at least one of the plurality of topics based on a sentiment expressed in the at least one sentence, the sentiment is identified based on analysis of the content, the analysis is a member of a group consisting of: visual analysis, audio analysis and text analysis.

12. The method of claim 1, further comprising computing the score for each of the plurality of sentences after splitting the video stream to a plurality of segments, the video stream is split to the plurality of segments using at least one clustering algorithm trained to cluster the video stream to segments based on a plurality of embedding vectors, each of the plurality of embedding vectors comprises a plurality of features extracted from the content of the video stream.

13. The method of claim 1, wherein the video clip is created by merging the plurality of video sections subsets according to an order of appearance of each of the plurality of topics in the video stream.

14. The method of claim 1, wherein the video clip is created by merging the plurality of video sections according to a priority score assigned to each of the plurality of topics.

15. The method of claim 1, further comprising embedding at least one hyperlink in at least one frame of at least one video section relating to at least one of the plurality of topics, the at least one hyperlink associates the at least one frame with at least one segment of the video stream relating to the at least one topic.

16. A system for creating automatically a short video clip summarizing highlights of a long video stream, comprising:
at least one processor configured to execute a code, the code comprising:
code instructions to identify a plurality of topics in a video stream based on analysis of a content of the video stream;
code instructions to extract a plurality of sentences based on analysis of a textual representation of the content;
code instructions to compute a score for each of the plurality of sentences indicating a relation of the respective sentence to each of the plurality of topics;
code instructions to select a plurality of sentence subsets from the plurality of sentences, each of the plurality of sentence subsets comprising at least one sentence having a highest score with respect to a receptive one of the plurality of topics, wherein at least one of the plurality of sentence subsets is selected for at least one of the plurality of topics based on a graph created for the textual representation by:
creating the graph by associating each of a plurality of vertices of the graph with a respective one of the plurality of sentences,
computing the score for each vertex of the plurality of vertices with respect to the respective topic,
identifying a root vertex having a highest score,
selecting a subset of vertices comprising the root vertex and at least one child vertex of the root vertex such that the root vertex and the at least one child vertex have a highest aggregated score, and
selecting the at least one sentence subset to include the sentences associated with the root vertex and the at least one child vertex:
code instructions to select a plurality of video sections each mapped to the at least one sentence of a respective one of the plurality of sentence subsets; and
code instructions to create a video clip by merging the plurality of video sections each relating to one of the plurality of topics.

17. A computer program product for creating automatically a short video clip summarizing highlights of a long video stream, comprising a non-transitory medium storing thereon computer program instructions which, when executed by at least one hardware processor, cause the at least one hardware processor to:
identify a plurality of topics in a video stream based on analysis of a content of the video stream;
extract a plurality of sentences based on analysis of a textual representation of the content;
compute a score for each of the plurality of sentences indicating a relation of the respective sentence with each of the plurality of topics;
select a plurality of sentence subset from the plurality of sentences, each of the plurality of sentence subsets comprising at least one sentence having a highest score with respect to a receptive one of the plurality of topics, wherein at least one of the plurality of sentence subsets is selected for at least one of the plurality of topics based on a graph created for the textual representation by:
creating the graph by associating each of a plurality of vertices of the graph with a respective one of the plurality of sentences,
computing the score for each vertex of the plurality of vertices with respect to the respective topic,
identifying a root vertex having a highest score,
selecting a subset of vertices comprising the root vertex and at least one child vertex of the root vertex such that the root vertex and the at least one child vertex have a highest aggregated score, and
selecting the at least one sentence subset to include the sentences associated with the root vertex and the at least one child vertex:
select a plurality of video sections each mapped to the at least one sentence of a respective one of the plurality of sentence subsets; and
create a video clip by merging the plurality of video sections each relating to one of the plurality of topics.

* * * * *